United States Patent [19]
Strub

[11] Patent Number: 5,775,679
[45] Date of Patent: Jul. 7, 1998

[54] TYING VISE FOR FLY-FISHING

[76] Inventor: Michael Strub, Kirchgasse 2-4, D-78579 Neuhausen, Germany

[21] Appl. No.: 614,385

[22] Filed: Mar. 12, 1996

[30]    Foreign Application Priority Data

Mar. 15, 1995 [DE] Germany .................. 295 04 371.7

[51] Int. Cl.$^6$ .................................................. B25B 1/22
[52] U.S. Cl. .................... 269/75; 269/71; 269/166; 269/907; 269/246; 269/95; 269/97; 269/139
[58] Field of Search .................. 269/75, 95, 139, 269/143, 97, 98, 166, 45, 244, 246, 242, 907, 71, 909

[56]         References Cited

U.S. PATENT DOCUMENTS

| 248,949 | 11/1881 | Pope | 269/166 |
|---|---|---|---|
| 1,149,346 | 9/1915 | Dubay | 269/246 |
| 1,708,617 | 4/1929 | Hargrave | 269/166 |
| 4,140,307 | 2/1979 | Dalmau et al. | 269/75 |
| 4,214,739 | 7/1980 | Dailey | 289/753 |
| 4,322,065 | 3/1982 | Doiron | 269/907 |
| 4,375,284 | 3/1983 | Doiron | 269/270 |
| 4,969,636 | 11/1990 | Gautam | 269/907 |
| 5,165,673 | 11/1992 | Newton, Jr. | 269/907 |
| 5,291,646 | 3/1994 | French | 269/97 |

*Primary Examiner*—James G. Smith
*Assistant Examiner*—Lee Wilson
*Attorney, Agent, or Firm*—Nields, Lemack & Dingman

[57]           ABSTRACT

Tying vise for an artificial fly. The tying vise has a clamp for attachment to a support and, connected to the clamp, a gripping jaw unit for gripping a fishhook, wherein the gripping jaw unit is connected to the clamp across an articulated arm equipped with joints on both ends, and wherein the joints are placed, respectively, on a leg of the clamp and on the gripping jaw unit in such a way that the clamp, articulated arm, and gripping jaw unit can be collapsed into a compact transport position.

12 Claims, 2 Drawing Sheets

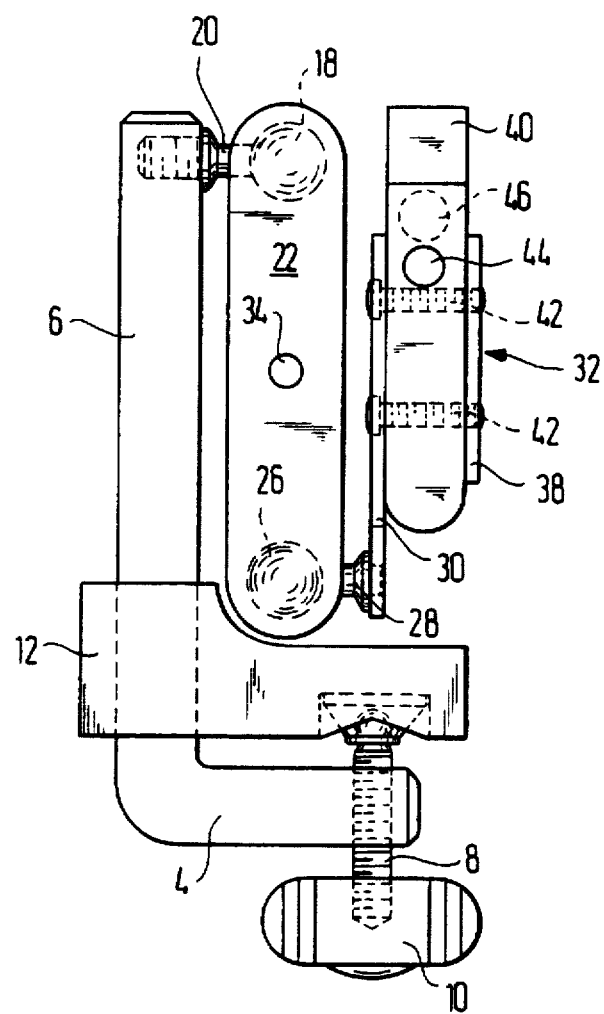

TYING VISE FOR FLY-FISHING

BACKGROUND OF THE INVENTION

The innovation concerns a tying vise for fly-fishing that has a clamp for attachment to a support and, connected to said clamp, a gripping jaw unit for gripping a fishhook.

An artificial fly is typically tied on the fishhook using a tying vise that has a gripping device for gripping the fishhook. The gripped fishhook can then be tied with colored fibrous material that simulates an insect to the fish. Commercial tying vises also come equipped with a clamp with which they can be secured, for example, to the edge of a boat, to a board, or to some other suitable object. This clamp is connected to a gripping jaw unit whose jaws grip the fishhook so the fishhook can be tied. In order to prevent fishing tackle from becoming overly bulky, it is desirable that the individual elements of the tackle be designed to take up as little space as possible, and from this perspective the prior-art tying vises are relatively unwieldy.

The object of the innovation, therefore, is to create a tying vise whose storage and transport take up as little space as possible, but which in use can still be handled normally.

Said object is achieved by the features indicated in claim 1, while improvements to the innovation are characterized in the dependent claims.

SUMMARY OF THE INVENTION

The provision of an articulated arm between the clamp and gripping jaw unit makes it possible to collapse the tying vise in accordance with the innovation into a compact, space-saving unit that is approximately the size of a pack of cigarettes and will easily fit into a coat pocket or pants pocket.

In a specific embodiment of the innovation, the clamp is executed as a screw clamp having an L-shaped member, one leg of which is traversed by a clamping screw and the other leg of which bears a slidable clamping foot. The board, branch, or other supporting object on which the tying vise will be clamped is placed between the clamping foot and the tightening screw. The ability of the clamping foot to slide on the leg supports the facile adaptation of the encompassed clamping diameter to the particular supporting object.

The shape of the components that move against each other—that is, the clamp, the articulated arm, and the gripping jaw unit—and the joint type are advantageously selected in such a way that in the collapsed position the three components lie parallel to one another at a minimum distance from one another and the tying vise takes up the minimum possible volume in this position.

In accordance with another advantageous embodiment of the innovation, the joints are designed as ball-and-socket-joints whose balls are each held by ball pivots on the gripping jaw unit and clamp. For maximum space utilization, one of the balls should reside on the end turned away from the clamping screw of the longer leg of the L-shaped clamp and the other ball should reside on an end of the gripping jaw unit. The articulated arm located in between can be formed from two metal strips, for example, aluminum strips, that have depressions in their ends to accept the balls. The strips are positioned against the balls on two sides and are held together by an adjustment screw in such a manner that they press against the balls on the two sides with an adjustable force. By adjusting this force with the adjustment screw, the articulated arm can fix the gripping jaw unit in any particular position with enough force that the fishhook gripped between the jaws can be unproblematically tied.

In an advantageous embodiment of the gripping jaw unit, two gripping jaws movable with respect to each other are supported between two guide plates. One of the gripping jaws is bolted down by the two guide plates, and the other gripping jaw slides between the two guide plates, for example, against the pressure of a spring. The mobile gripping jaw can be fixed against the stationary gripping jaw using a T-screw: by loosening this screw the gap between the gripping jaws can be increased and vice-versa. In order to obtain a parallel grip, a fishhook can be introduced between the back ends of the gripping jaws that is just as thick as the fishhook introduced between the front ends. The two gripping jaws will then be parallel to one another when screwed together, which will provide more protection against slipping by the fishhook to be tied.

The innovation is explained in greater detail below with the aid of an exemplified embodiment shown in the appended drawings.

BRIEF DESCRIPTION OF THE DRAWINGS

FIG. 2 is a view of the tying vise in its collapsed transport position in accordance with the present invention.

DETAILED DESCRIPTION OF THE INVENTION

Figure 1:
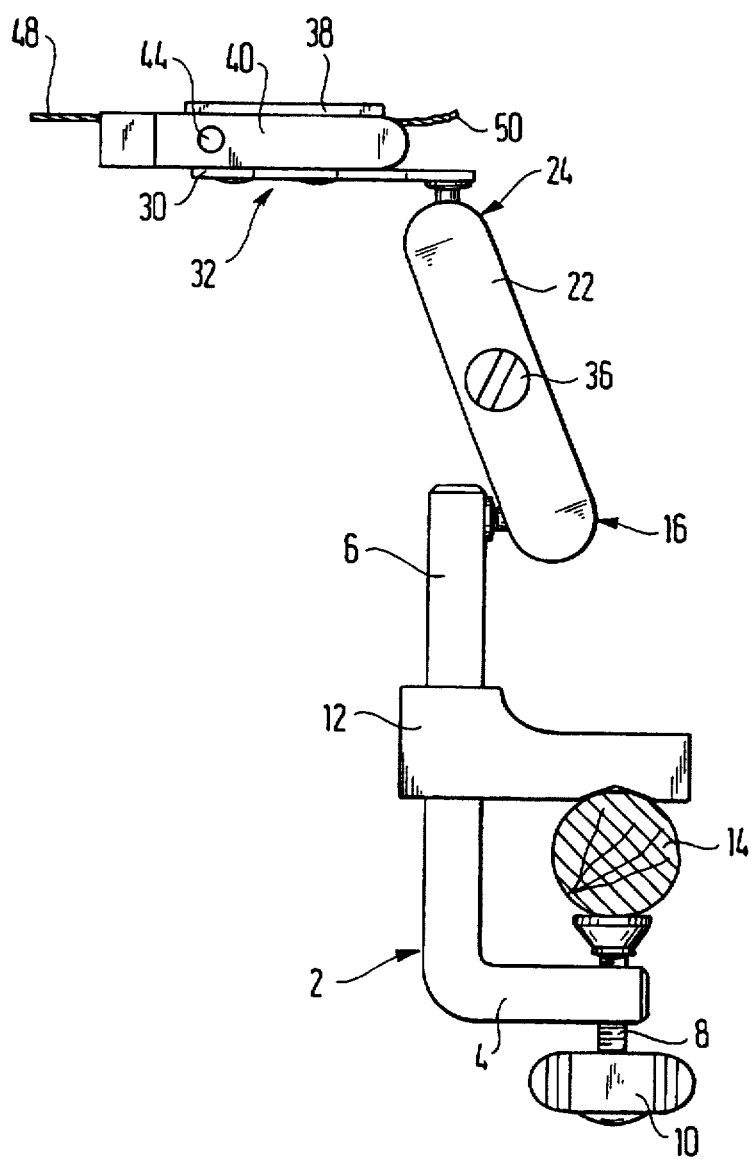
FIG. 1 is a view of the tying vise in its unfolded use position in accordance with the present invention.

An L-shaped clamp 2 with a short leg 4 and a long leg 6 is depicted in FIG. 1. The short leg 4 is traversed by a clamping screw 8 which, with the aid of a T-handle 10, can be clamped against a clamping foot 12. Said clamping foot 12 is slidably supported on the long leg 6 of the clamp 2. The tying vise can be fastened, for example, to a branch 14, using the clamping screw 8 and clamping foot 12. The clamping foot 12 can be adjusted on the long leg 6, for example, with a thumbscrew, as a function of the thickness of the branch or other supporting object on which the tying vise will be fastened.

Figure 3:
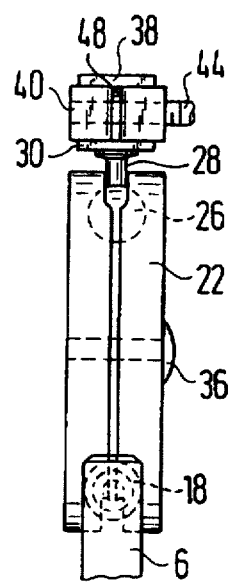
FIG. 3 is a view showing the upper part of FIG. 1 as seen from the left-hand side.

As can be seen in greater detail in FIGS. 2 and 3, a ball-and-socket joint 16 is attached at the upper end of the leg 6 in the figure. A ball 18 is screwed into the upper end of the leg 6 with a ball pivot 20, and the ball is encompassed on two sides by flat strips. These flat strips form the articulated arm 22 and carry depressions at their ends for the concave acceptance of the balls. The opposite end of the articulated arm 22 carries a second ball-and-socket joint 24 with a ball 26 that sits with a ball pivot 28 on a guide plate 30 wherein said guide plate 30 forms part of the gripping jaw unit 32. The two flat strips of the articulated arm 22 are connected with one another by an adjustment screw 34 with a slotted head 36 that can be adjusted with a coin so as to press the two strips against the balls 18, 26 with enough force to satisfactorily immobilize the ball-and-socket joints 16, 24.

The gripping jaw unit 32 contains a second guide plate 38 in parallel to the above-described guide plate 30, and one of the two gripping jaws 40 is bolted down by screws 42 between these two guide plates. The other gripping jaw can move between the two guide plates and can be tightened or loosened relative to the first-mentioned gripping jaw through the use of a screw 44 operating against the force of a spring 46. To this end, the screw 44, just like the clamping screw 8, is advantageously equipped with a T-head which, however, is not shown here.

As shown in FIG. 1, the tying vise can be used by opening it up from the collapsed position shown in FIG. 2 and firmly clamping it onto, for example, a branch 14. The two ball-and-socket joints 16 and 24 permit an unrestricted alignment of the gripping jaw unit 32 into a comfortable position for tying the gripped fishhook 48. By loosening the screw 44 the distance between the two gripping jaws 40 can be increased enough to permit the insertion of fishhooks 48 and 50 between, respectively, the jaws at the front and at the back. These jaws can then be firmly clamped by tightening the screw 44. This gripping of the rear hook 50 makes the two gripping jaws 40 parallel, with the result that the fishhook to be tied will be gripped between parallel jaws and the fishhook will not slide around during tying. After tying the fishhook 48, the screw 44 is re-loosened in order to remove the fishhook. When the tying vise is no longer needed after fishing, it can be simply and quickly collapsed into the transport position shown in FIG. 2 and as desired put away in a storage bag of correspondingly small size.

I claim:

1. Tying vise for fly-fishing that has a clamp having a first leg for attachment to a support and, connected to said clamp, a gripping jaw unit for gripping a fishhook, said gripping jaw unit (32) having a guide plate (30) and being connected to said clamp (2) across an articulated arm (22) equipped with joints (16, 24) on both ends, said joints having balls (18, 26) attached thereto each with a ball pivot (20, 28) respectively on said first leg (6) and on said guide plate (30) of said gripping jaw unit (32), said articulated arm (22) being formed by two plate strips having respective ends which encompass said balls (18, 26) on two sides wherein said strips are held together by an adjustment screw (34, 36) that traverses them, and wherein said articulated arm (22) is pivoted, respectively, to said first leg (6) of said clamp (2) and to said gripping jaw unit (32) in such a way that said tying vise can be folded into a compact transport position, in which said gripping jaw unit (32), said articulated arm (22), and said leg (6) of the clamp (2) carrying the clamping foot (12) lie approximately parallel to one another.

2. Tying vise according to claim 1, wherein said clamp (2) is shaped like an L thereby forming said first leg (6) and a second leg (4); said second leg (4) being traversed by a clamping screw (8); and said first leg (6) carrying a slidable clamping foot (12) that in combination with the clamping screw (8) functions as a screw clamp.

3. Tying vise according to claim 2, wherein in the transport position the gripping jaw unit (32), the articulated arm (22), and the leg (6) of the clamp (2) carrying the clamping foot (12) lie approximately parallel to one another.

4. Tying vise according to claim 2, wherein the gripping jaw unit (32) has two parallel guide plates (30, 38) that between them support two gripping jaws (40) that can advance toward each other.

5. Tying vise according to claim 4, wherein a first of said two gripping jaws (40) is bolted down by said guide plates (30, 38) and a second of said two gripping jaws can undergo a spring-loaded sliding displacement with respect to said first griping jaw and said second gripping jaw can be clamped against said first gripping jaw by a tightening screw (44).

6. Tying vise according to claim 3, wherein the gripping jaw unit (32) has two parallel guide plates (30, 38) that between them support two gripping jaws (40) that can advance toward each other.

7. Tying vise according to claim 6, wherein a first of said two gripping jaws (40) is bolted down by said guide plates (30, 38) and a second of said two gripping jaws can undergo a spring-loaded sliding displacement with respect to said first gripping jaw and said second gripping jaw can be clamped against said first gripping jaw by a tightening screw (44).

8. Tying vise according to claim 1, wherein in the transport position the gripping jaw unit (32), the articulated arm (22), and the leg (6) of the clamp (2) carrying the clamping foot (12) lie approximately parallel to one another.

9. Tying vise according to claim 8, wherein the gripping jaw unit (32) has two parallel guide plates (30, 38) that between them support two gripping jaws (40) that can advance toward each other.

10. Tying vise according to claim 9, wherein a first of said two gripping jaws (40) is bolted down by said guide plates (30, 38) and a second of said two gripping jaws can undergo a spring-loaded sliding displacement with respect to said first gripping jaw and said second gripping jaw can be clamped against said first gripping jaw by a tightening screw (44).

11. Tying vise according to claim 1, wherein the gripping jaw unit (32) has two parallel guide plates (30, 38) that between them support two gripping jaws (40) that can advance toward each other.

12. Tying vise according to claim 11, wherein a first of said two gripping jaws (40) is bolted down by said guide plates (30, 38) and a second of said two gripping jaws can undergo a spring-loaded sliding displacement with respect to said first gripping jaw and said second gripping jaw can be clamped against said first gripping jaw by a tightening screw (44).

* * * * *